United States Patent
Mertel (10) Patent No.: US 10,693,211 B2
(45) Date of Patent: Jun. 23, 2020

(54) CONTROLLER FOR CONFIGURING ANTENNAS HAVING ADJUSTABLE ELEMENTS

(71) Applicant: Fluidmotion, Inc., Bellevue, WA (US)

(72) Inventor: Michael E. Mertel, Bellevue, WA (US)

(73) Assignee: SteppIR Communications Systems Inc., Bellevue, WA (US)

( * ) Notice: Subject to any disclaimer, the term of this patent is extended or adjusted under 35 U.S.C. 154(b) by 137 days.

(21) Appl. No.: 15/697,338

(22) Filed: Sep. 6, 2017

(65) Prior Publication Data

US 2019/0074572 A1    Mar. 7, 2019

(51) Int. Cl.

| | |
|---|---|
| *H01Q 1/10* | (2006.01) |
| *H01Q 9/16* | (2006.01) |
| *H01Q 19/04* | (2006.01) |
| *G05B 15/02* | (2006.01) |
| *H01Q 1/08* | (2006.01) |
| *H01Q 3/01* | (2006.01) |
| *H01Q 19/28* | (2006.01) |
| *H01Q 9/14* | (2006.01) |

(52) U.S. Cl.
CPC .............. *H01Q 1/103* (2013.01); *G05B 15/02* (2013.01); *H01Q 1/08* (2013.01); *H01Q 1/10* (2013.01); *H01Q 3/01* (2013.01); *H01Q 9/14* (2013.01); *H01Q 9/16* (2013.01); *H01Q 19/04* (2013.01); *H01Q 19/28* (2013.01)

(58) Field of Classification Search
CPC .......... H01Q 1/103; H01Q 1/08; H01Q 19/28; H01Q 9/14; H01Q 19/04; H01Q 3/01; H01Q 9/16; G05B 15/02

USPC ......................................................... 343/823
See application file for complete search history.

(56) References Cited

U.S. PATENT DOCUMENTS

| | | |
|---|---|---|
| 2,967,300 A | 1/1961 | Haughawout |
| 2,981,834 A | 4/1961 | Holloway et al. |
| 3,487,415 A | 12/1969 | Simons |
| 3,653,056 A | 3/1972 | Peterson |
| 3,683,391 A | 8/1972 | Callaghan |
| 4,028,709 A | 6/1977 | Berkowitz et al. |
| 4,290,071 A | 9/1981 | Fenwick |
| 4,604,628 A | 8/1986 | Cox |
| 5,061,944 A | 10/1991 | Powers et al. |

(Continued)

OTHER PUBLICATIONS

Gibson, William, "A Teletuned 10-Meter Beam", QST, Cover Page and p. 35, Aug. 1952.

*Primary Examiner* — Hai V Tran
(74) *Attorney, Agent, or Firm* — Glass and Associates; Kenneth Glass; Kenneth D'Alessandro (57) ABSTRACT

A method for controlling the lengths of length adjustable elements of an antenna includes engaging a motor drive assembly coupled to each length adjustable element and in response to signals from a motor controller for adjusting the length of the length-adjustable antenna elements to element lengths provided by element length tables coupled to the motor controller, running antenna modeling software coupled to the motor controller to generate antenna performance data as a function of antenna element lengths, and driving the motor controller for each motor drive assembly from data in the element length tables to adjust the lengths of the length-adjustable elements in response to commands entered into a user interface or commands generated by the antenna modeling software running in the processor.

18 Claims, 8 Drawing Sheets

(56) References Cited

U.S. PATENT DOCUMENTS

| | | | |
|---|---|---|---|
| 5,189,435 A | 2/1993 | Yarsunas et al. | |
| 5,220,341 A | 6/1993 | Yamazaki | |
| 5,841,406 A | 11/1998 | Smith | |
| 5,865,390 A | 2/1999 | Iveges | |
| 5,995,061 A | 11/1999 | Schiller | |
| 6,107,969 A | 8/2000 | Gulino et al. | |
| 6,154,180 A | 11/2000 | Padrick | |
| 6,300,912 B1 | 10/2001 | Pla | |
| 2002/0171598 A1* | 11/2002 | Mertel | H01Q 1/10 343/818 |
| 2007/0229386 A1* | 10/2007 | Mertel | H01Q 3/12 343/823 |
| 2010/0277388 A1* | 11/2010 | Wright | H01Q 1/08 343/815 |

* cited by examiner

CONTROLLER FOR CONFIGURING ANTENNAS HAVING ADJUSTABLE ELEMENTS

BACKGROUND

The present invention relates to the field of radio antennas, and to wide frequency coverage vertical, dipole and parasitic array antennas. More particularly, the present invention relates to control of wide frequency coverage vertical, dipole and parasitic array antennas.

DESCRIPTION OF THE RELATED ART

It is often desired to provide a single antenna having excellent performance over a wide frequency range. In the interest of efficiency and impedance matching, antennas used for radio communication are generally resonant antennas. Unfortunately, resonant antennas by their nature operate over a very narrow range of frequencies. To be resonant at a specific frequency, the antenna must be a certain specific length.

Three commonly used resonant antennas are the dipole, vertical antennas and Yagi-Uda antennas (hereinafter "Yagi antennas"). A dipole antenna is comprised of a single element, usually one half of a wavelength long at the design frequency. It is then usually split at the center where electromagnetic energy is then fed. Vertical antennas are basically dipoles oriented in a vertical plane with one half of the element being driven and the other half removed. The earth is then used as a conductor in its place. Yagi antennas, frequently referred to as parasitic arrays, are known in the art to provide directional transmission and reception with a high front-to-back ratio as well a low VSWR throughout a very narrow band of contiguous frequencies. Most embodiments of a Yagi antenna use a single element that is driven from a source of electromagnetic energy. Arrayed with the driven single element are the so-called reflector and director elements that are not driven directly, known as parasitic elements. There is usually only one reflector and one or more directors, with the favored direction of transmitting and reception towards the director elements.

The Yagi antenna is basically a single frequency device that can be designed to work satisfactorily over a few percent of the center design frequency. However, tradeoffs must be made between gain, front-to-back ratio, and VSWR to allow the antenna to work over this very narrow 3%-4% range. It is often desirable to have a single Yagi antenna operate in multiple frequency bands. Many radio services have assigned frequencies segregated into bands scattered through the radio spectrum. The amateur radio service is a good non-limiting example of this, having bands approximately centered at 160 M, 80 M, 40 M, 30 M, 20 M, 17 M, 15 M, 12 M, 10 M, 6 M, 2 M, etc. Radio amateurs commonly use Yagi arrays in the 40 M and higher bands. Some prior art antenna designs address multiple bands that cover three of the aforementioned bands, and in some cases five bands, but with very compromised performance. To provide even marginal performance, these antenna designs require large and complex arrays.

To enable wider frequency coverage, three methods have been classically employed. A common method is the use of "traps" that allow one element to function on three bands. Traps are parallel-resonant circuits placed at specific locations on the element to decouple a portion of the element automatically as the antenna operation is changed from band to band. Although multi-element trapped antennas cover multiple frequencies with fewer elements than others designs, they cannot be optimally tuned and there are significant losses associated with traps in all of the elements including the driven element. A trapped Yagi antenna is a significant compromise in gain, front-to-back ratio, and overall efficiency.

Another method to obtain wider frequency coverage is the use of a so-called log-periodic antenna, in which every element is driven and no element is parasitically driven. This type of antenna can operate over a range of frequencies having a ratio of 2:1 or higher. The antenna impedance varies logarithmically so the VSWR can range as high as 2:1. The log-periodic antenna trades off wide bandwidth for gain and front-to-back ratio. The log-periodic antenna has less gain and less front-to-back ratio than a three element monoband Yagi antenna yet requires many more elements and a complex feed system.

Yet another method of obtaining wider frequency coverage is the use of an open-sleeve cell type of driven element. This method uses one or more parasitically excited elements placed very close to the driven element. The length of these parasitic elements is usually half that of the driven element. This method results in a wider VSWR bandwidth and the ability to operate on two different frequencies with a single feedline. However, the open-sleeve technique only applies to a driven element. Yagi antennas require additional dedicated parasitic elements for each anticipated frequency band.

Finally, tunable antenna systems have been provided that allow changing the lengths of the individual element(s) that make up the antenna to change the frequency at which they resonate. An example of such a system is disclosed in U.S. Pat. No. 6,677,914 to Mertel, reissued as U. S. Pat. No. RE 42,087. Both of these documents are incorporated herein by reference in their entirety. The tunable antenna systems disclosed in these patents allows setting the resonant frequency of a single-element or multiple element antenna to almost any frequency limited principally by the physical dimensions of the variable-length components employed in fabricating the antenna. These tunable antenna systems employ stepper motors that adjust the lengths of the conductors forming the antenna elements under the control of an electronic control unit.

In addition, various software programs have been developed to model antenna performance based on the physical characteristics of the desired antenna. The Numerical Electromagnetics Code (NEC) is a popular modeling system for wire and surface antennas. Multiple versions of this software, e.g., MININEC and EZNEC are marketed to the public. Use of these antenna-modeling software products enables a user to determine the characteristics of an antenna prior to physically constructing the antenna, and also provides information to a user concerning the changes in antenna properties resulting from changes in characteristics such as the length, thickness, spacing, and orientation of the physical conductors that will be assembled to form the antenna. When used with antennas such as those described in U.S. Pat. No. 6,677,914 to Mertel, reissued as U. S. Pat. No. RE 42,087, such software modeling programs allow a user to visualize the performance of the as-tuned antenna.

Figure 1A:
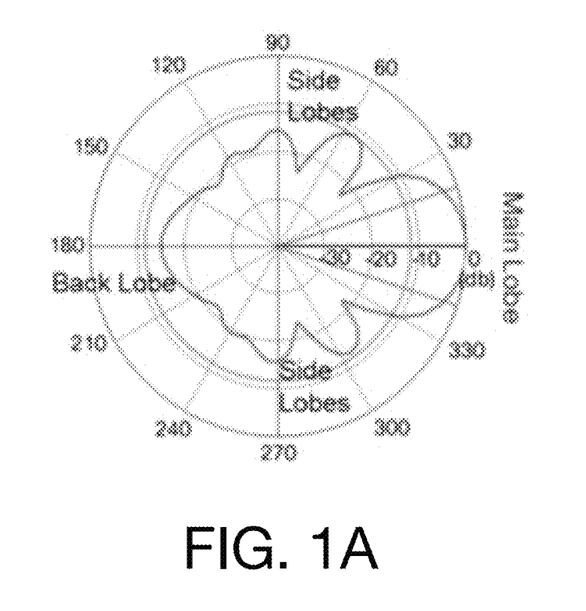
FIG. 1A is a graph showing a typical polar co-ordinate plot of antenna gain as a function of spatial orientation.
Figure 1B:
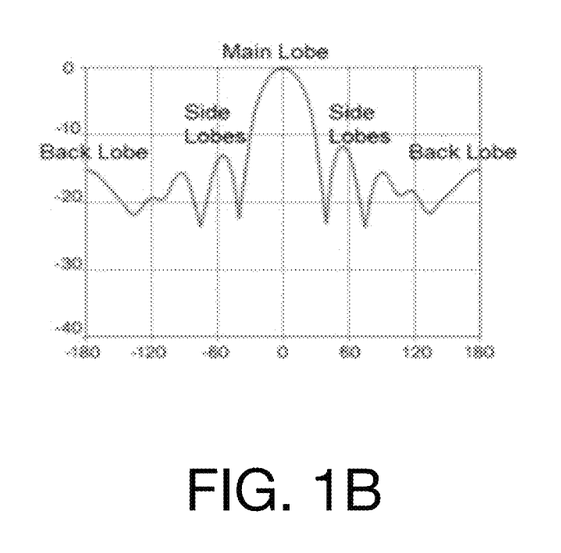
FIG. 1B is a graph displaying the same data from FIG. 1A plotted in Cartesian co-ordinate form.

One way to visualize the performance of an antenna is to generate a graph plotting antenna gain as a function of spatial orientation. The above-mentioned software modeling programs can generate such graphs. FIG. 1A shows a typical polar co-ordinate plot of antenna gain as a function of spatial orientation and FIG. 1B is a graph displaying the same data plotted in Cartesian co-ordinate form. The polar coordinate form displayed in FIG. 1A is the most-often used representation of such data. As can be seen from examining FIGS. 1A and 1B, the maximum gain of a Yagi antenna is at an angle of 0°, which is along the axis of the boom of the antenna.

Various characteristics of the antenna can be determined from the data used to generate the graphs of FIGS. 1A and 1B. As will be appreciated by persons of ordinary skill in the art Some of the more useful characteristics are forward gain, beam width (defining the angle between which the forward gain decreases from a maximum level at 0° in both directions to a preselected attenuation usually expressed in dB), front-to-back ratio, (expressing the difference between the gain in the forward direction (at 0°) and the rear direction (at 180°), and front-to-side ratio (expressing the difference between the gain in the forward direction (at 0°) and at opposing sides of the antenna (at 90° and at 270°, respectively). Because Yagi antennas are resonant antennas, antenna bandwidth (the range of frequencies at which the standing wave ratio (SWR) is below a threshold level— usually 2:1) may also be an important antenna characteristic. Persons of ordinary skill in the art will appreciate that other characteristics of the antenna may be of interest for different purposes.

The characteristics of a Yagi antenna will depend on the design criteria used for the antenna. These design criteria include the number of elements employed, the lengths of the elements, the thickness of the conductors used to form the elements, the spacing of the elements from one another along the boom supporting the antenna elements. The performance of fixed Yagi antennas, referring to antennas having a fixed number of elements that are spaced at a fixed distance from one another, can be predicted using antenna modeling software and are capable of generating data that can be presented visually in graphical formats such as those shown in FIG. 1A and FIG. 1B.

Yagi antenna designers who design fixed Yagi antennas design the antennas to exhibit combinations of the above-mentioned characteristics that are determined to be most useful for successful marketing of the antennas. The particular characteristics chosen can often depend on the intended use of the antenna.

The behavior of tunable antennas such as those disclosed in U.S. Pat. No. 6,677,914 to Mertel, reissued as U. S. Pat. No. RE 42,087, can also be predicted using antenna-modeling software. Indeed, products designed and marketed by FluidMotion, Inc, under the Steppir® trademark employ controllers that drive stepper motors to set the lengths of the individual antenna elements. The controllers are shipped to customers with default element lengths programmed into them for different frequency ranges. The default lengths are predetermined to configure an antenna having preselected ones of some of the characteristics mentioned above. Provision is made to allow users to operate the controllers to manually control the lengths of the element(s) or to alter the individual pre-programmed length settings for the individual elements, to reverse the forward and reverse directions of the antenna, and to configure the antennas in a bi-directional mode.

BRIEF DESCRIPTION

According to one aspect of the present invention, a controller is configured to allow beamwidth adjustment from the controller front panel in real time and to display the result in units such as degrees. For example, beamwidth could be set to 3 dB width or whatever other width is most useful for a particular application (that could even be user selectable). This feature provides more flexibility than simply switching between a 2-element, a 3-element, and a 4-element beam to change the beamwidth pattern because a higher gain can be achieved over the same beamwidth as a lower gain antenna by using an antenna having more elements that are adjustable. For example, a 5-element beam can outperform a two-element beam over the same beam width by judicious adjustment of the lengths of all 5 elements.

Such a feature provides several advantages. The forward lobe of the antenna can be adjusted to suit any particular operating situation, the range of angles achievable is dependent on how many elements are provided on the particular antenna. For example, a 5-element antenna can be adjusted to have a 3 dB beamwidth ranging from about 60° to about 90° while a two-element antenna could be adjusted to have a 3 dB beamwidth ranging from about 80° to about 100°). Persons of ordinary skill in the art will appreciate that these numbers are approximate.

Emergency communications can also benefit from the ability to change the azimuthal coverage of the antenna.

The controller of the present invention can provide a bi-directional mode that can control the energy radiated from each end of the beam in adjustable increments, such as, but not limited to percent ratios such as, 50/50, 40/60, 30/70 etc.

Such control in accordance with the present invention provides several advantages. For example, stations located in opposite directions may be of much different signal strengths, and the ability to adjust the ratio of front to rear radiation would allow better communication overall. Other situations may also benefit from the ability to selectively direct more or less energy in each direction.

According to another aspect of the present invention, the user is permitted to input data defining the height at which the antenna is mounted. This feature permits the elements to be adjusted for optimum antenna performance at that height. This feature of the present invention provides a benefit where antennas are mounted at heights lower than one wavelength at the frequency of operation. Antennas that are mounted at 0.5 wavelength and lower can benefit greatly from this feature with regard to front-to-back ratio as well as gain improvement (to a lesser degree). In accordance with the present invention, front-to-back ratio of the antenna can be improved by as much as 5 to 8 dB when compared to using a model set at the more typical 1 wavelength height used as design criteria by most antenna manufacturers.

According to another aspect of the present invention, the controller can be used to significant advantage when yagi antennas are stacked. In such situations there are optimal element lengths that differ significantly from a single yagi. In accordance with this aspect of the present invention, the optimal element lengths for stacked antennas can also be stored in the controller memory to control the element lengths for both antennas in the stacked arrangement.

According to another aspect of the present invention, the controller can be used to store multiple rear patterns that can be quickly implemented from front panel controls by a user to provide a "filters" to reduce interference emanating from particular directions. The range of front-to-back ratio values is fairly extensive in a yagi antenna. For example a 4-element yagi set to default settings on 20 meters may have about a 25 dB front-to-back ratio. This value can be increased to about 31 dB at the expense of only about 1.5 dB of forward gain. This difference is instantly noticeable to the operator.

According to another aspect of the present invention, the controller can be used to store other user-selectable patterns. Examples of such patterns are a 180° deep null, typically 40 dB sometimes as much as 50 dB. Another example is user control of optimal front to side rejection. Such control can typically improve rejection from 120 degrees to 90 degrees by about 15 to 20 dB or provide multiple nulls that typically occur at 120 and 240 degrees.

According to another aspect of the present invention, antenna modeling software (such as an NEC based modeling software) is resident in the controller (or in a user computer connected to the controller) and allows real time creation and display of an infinite number of antennas, including plots of all the antenna parameters. Once an antenna having desired characteristics is modeled, the user enables the controller to implement the modeled antenna by controlling the individual element lengths in accordance with the selected model. Numerous models may be stored and recalled using the controller.

According to another aspect of the present invention, a single rotary knob can be used to control the entire range of the antenna from maximum gain in the forward direction, transitioning to a bi-directional mode, and all the way to 180° (maximum gain in the reverse direction) and everything in between.

According to another aspect of the present invention, the antenna vendor can provide for realtime internet download to the controller element length tables of a virtually unlimited range of antenna models.

According to another aspect of the present invention, an SWR/Power meter can be built into the controller than can be programmed to disable the transmitter when SWR exceeds a preset limit Power output can also be monitored to ensure that pre-stored power limits for the connected antenna are not exceeded. This is especially valuable in the case of antennas that have different power limits on different bands.

According to another aspect of the present invention, the controller is configured to multiplex all of the data and power over the coax line feeding the antenna to eliminate the need for a control cable to the element length control motors.

The present invention enables realization of the full performance envelope of any adjustable yagi antenna that is limited only by fixed antenna characteristics, such as the boom length and element placement on the boom in antennas that do not permit adjustment of these characteristics.

DETAILED DESCRIPTION

Those of ordinary skill in the art will realize that the following description of the present invention is illustrative only and not in any way limiting. Other embodiments of the invention will readily suggest themselves to such skilled persons.

Figure 2A:
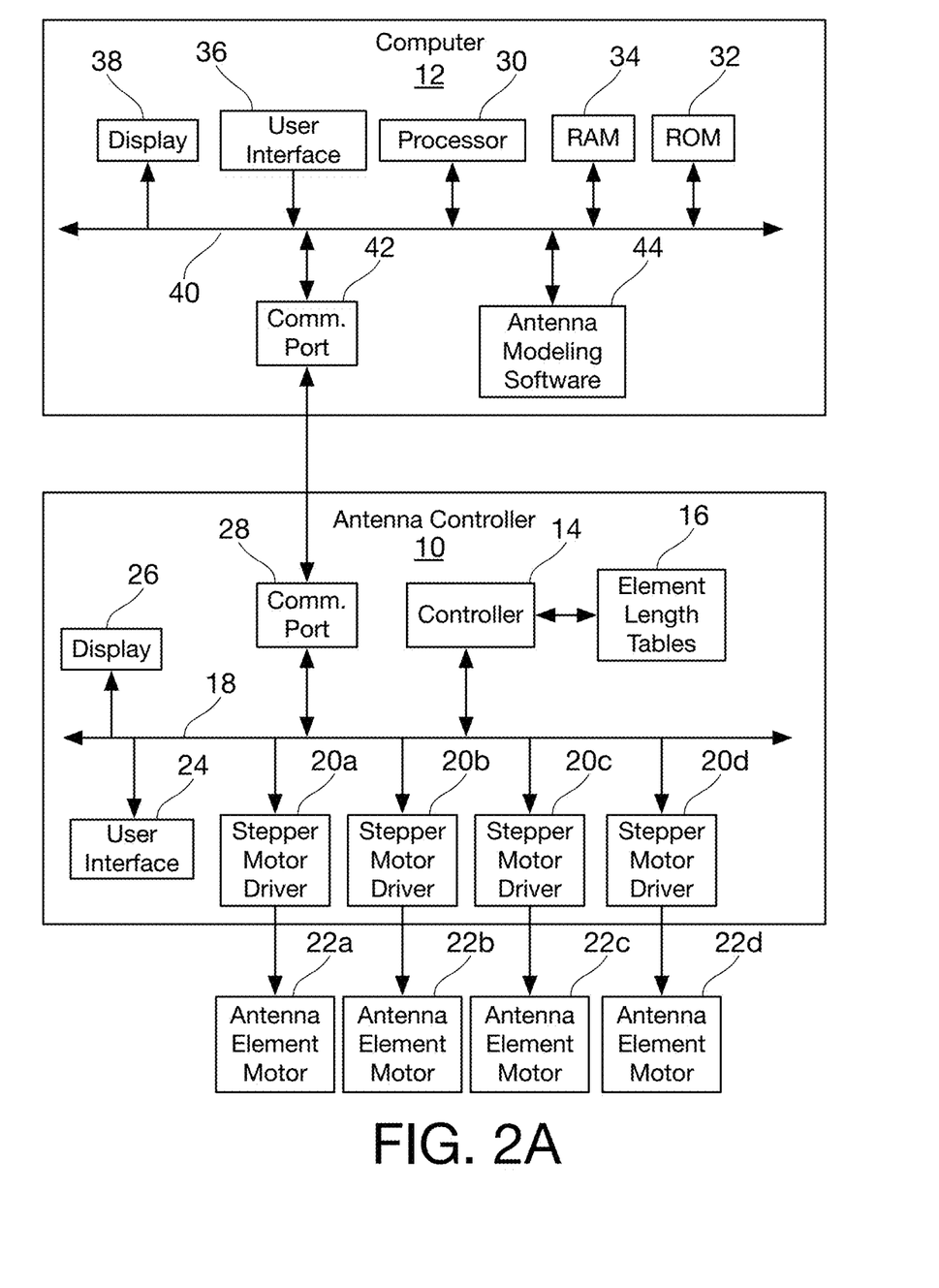
FIG. 2A is a block diagram showing an illustrative controller in accordance with an aspect of the present invention.

Referring now to FIG. 2A, a block diagram shows an illustrative controller 10 in accordance with an aspect of the present invention. Controller 10 is in communication with a computer 12.

Controller 10 includes a controller 14 which may be a microcontroller or microprocessor as is known in the art. Controller 14 uses data from element length tables 16 to provide signals across bus 18 to stepper motor drive circuits 20a, 20b, 20c, and 20d to drive antenna element length controller motors 22a, 22b, 22c, and 22d, respectively, associated with a tunable antenna. Persons of ordinary skill in the art will appreciate that while four stepper motor drive circuits 20a, 20b, 20c, and 20d are shown driving four antenna element length controller motors 22a, 22b, 22c, and 22d, a system allowing control of fewer elements than four or a greater number of elements than four are contemplated within the scope of the present invention.

The basic operation of such a system is known in the art and is described in U.S. Pat. No. 6,677,914 to Mertel, reissued as U. S. Pat. No. RE 42,087.

Controller 10 includes a user interface 24 and a display 26. User interface 24 includes user controls to select functions such as frequency setting, control of individual element lengths, and operating modes (e.g., forward operation, reverse operation, bi-directional operation), which may be displayed appropriately on display 26. Persons of ordinary skill in the art will appreciate that the display 26 can be integral with controller 10 or can be an external display. Controller 10 communicates with computer 12 via com port 28. Persons of ordinary skill in the art will appreciate that com port 28 may employ any type of wired or wireless protocol as is well known in the art.

Computer 12 may be a general-purpose computer includes processor 30, ROM 32, RAM 34 user interface 36, and display 38 all communicating with each other via bus 40 as is well known in the art. Computer 12 communicates with controller 10 via com port 42.

Computer 12 runs an antenna modeling software program 44. Antenna modeling software programs are known in the art. Computer 12 and antenna modeling software program 44 are configured to pass data both ways between antenna modeling software program 44 and controller 10. Such a configuration is easily implemented by any skilled programmer and the present invention is not limited to any particular configuration.

The arrangement of FIG. 2A allows two-way communications between the antenna modeling software running in the computer 12 and the controller 10. This arrangement allows antennas modeled in the antenna modeling software 44 running in computer 12 to be downloaded into controller 10 and implemented in the tunable antenna by controlling the antenna element length controller motors 22a, 22b, 22c, and 22d. This arrangement also allows the data representing any antenna configuration implemented in the tunable antenna to be uploaded to the antenna modeling software 44 for analysis. In this manner, antennas modeled by antenna modeling software 44 may be implemented by controller 10 and the configuration of any particular antenna implemented by controller 10 may be modeled by antenna modeling software 44. In accordance with the present invention, this communication allows data such as shown in FIGS. 1A and 1B for any particular antenna to be displayed graphically either on display 38 associated with computer 12, or to be downloaded to the display 26 of antenna controller 10.

Figure 2B:
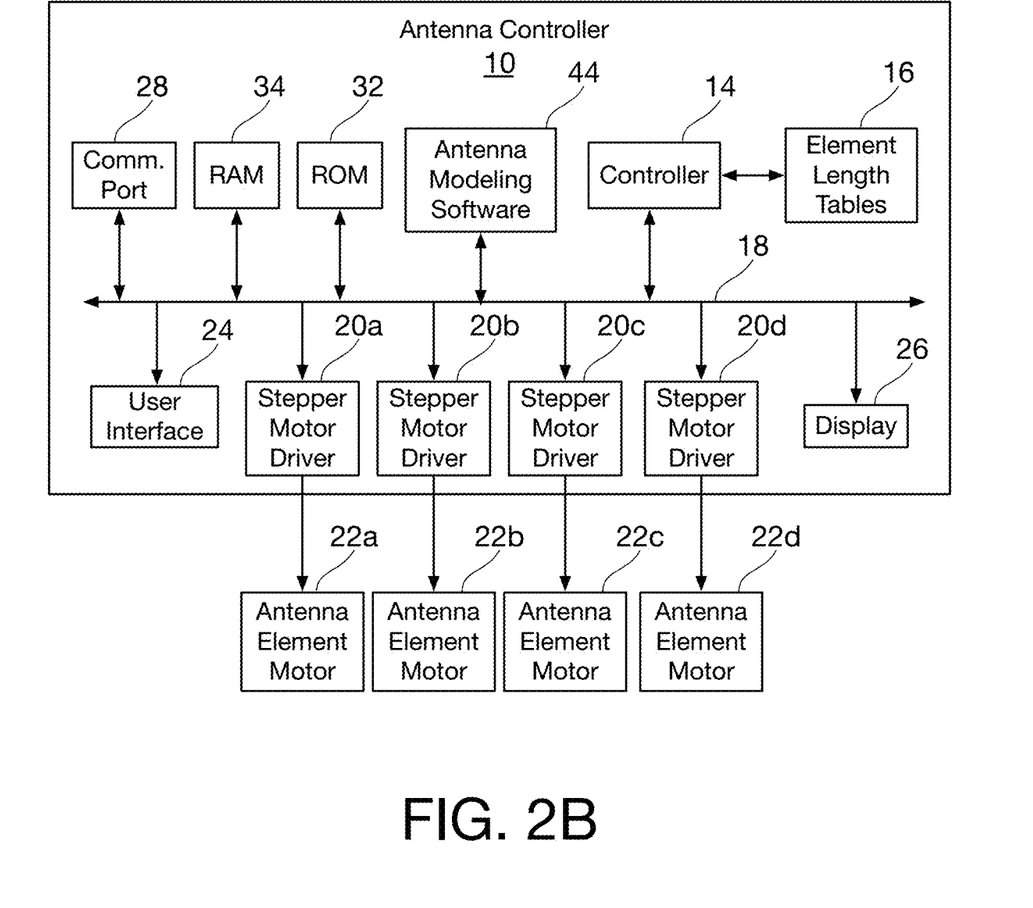
FIG. 2B is a block diagram showing an illustrative controller in accordance with an aspect of the present invention.

Referring now to FIG. 2B, a block diagram shows an illustrative controller 50 in accordance with an aspect of the present invention. Many of the elements of controller 10 of FIG. 2A are present in the controller 50 of FIG. 2B and those elements from controller 10 of FIG. 2A that are present in FIG. 2B will be identified using the same reference numerals used to designate those elements in FIG. 2A.

Controller 50 is similar to controller 10 of FIG. 2A but runs the antenna modeling software 44 internally without need to communicate with an external computer 12 as in FIG. 2A.

Controller 10 includes a controller 14 which may be a microcontroller or microprocessor as is known in the art. Controller 14 uses data from element length tables 16 to provide signals across bus 18 to stepper motor drive circuits 20a, 20b, 20c, and 20d to drive antenna element length controller motors 22a, 22b, 22c, and 22d, respectively, associated with a tunable antenna. Persons of ordinary skill in the art will appreciate that while four stepper motor drive circuits 20a, 20b, 20c, and 20d are shown driving four antenna element length controller motors 22a, 22b, 22c, and 22d, a system allowing control of fewer elements than four or a greater number of elements than four are contemplated within the scope of the present invention.

The basic operation of such a system is known in the art and is described in U.S. Pat. No. 6,677,914 to Mertel, reissued as U. S. Pat. No. RE 42,087.

Antenna controller 10 includes a user interface 24 and a display 26. Persons of ordinary skill in the art will appreciate that the display 26 can be integral with controller 10 or can be an external display. User interface 24 includes user controls to select functions such as frequency setting, control of individual element lengths, and operating modes (e.g., forward operation, reverse operation, bi-directional operation), which may be displayed appropriately on display 26. Controller 10 communicates with external devices via com port 28. Persons of ordinary skill in the art will appreciate that com port 28 may employ any type of wired or wireless protocol as is well known in the art.

In addition to performing the functions performed by controller 14 in the system shown in FIG. 2A, Antenna controller 50 runs the antenna modeling software program 44 internally on controller 14 in the system of FIG. 2B. As in the system described with reference to FIG. 2A, antenna modeling software program 44 is configured to pass antenna configuration data both ways to and from controller 10. Such a configuration is easily implemented by any skilled programmer and the present invention is not limited to any particular configuration.

The arrangement of FIG. 2B allows two-way communications between the antenna modeling software running in the computer 12 and the controller 10. This arrangement allows antennas modeled in the antenna modeling software 44 running on controller 14 to be downloaded into controller 14 and implemented in the tunable antenna by controlling the antenna element length controller motors 22a, 22b, 22c, and 22d. This arrangement also allows the data representing any antenna configuration implemented in the tunable antenna to be uploaded to the antenna modeling software 44 for analysis. In this manner, antennas modeled by antenna modeling software 44 may be implemented by controller 10 and the configuration of any particular antenna implemented by controller 10 may be modeled by antenna modeling software 44. In accordance with the present invention, this communication allows data such as shown in FIGS. 1A and 1B for any particular antenna to be displayed graphically either on display 38 associated with computer 12, or to be downloaded to the display 26 of antenna controller 10.

Figure 3A:
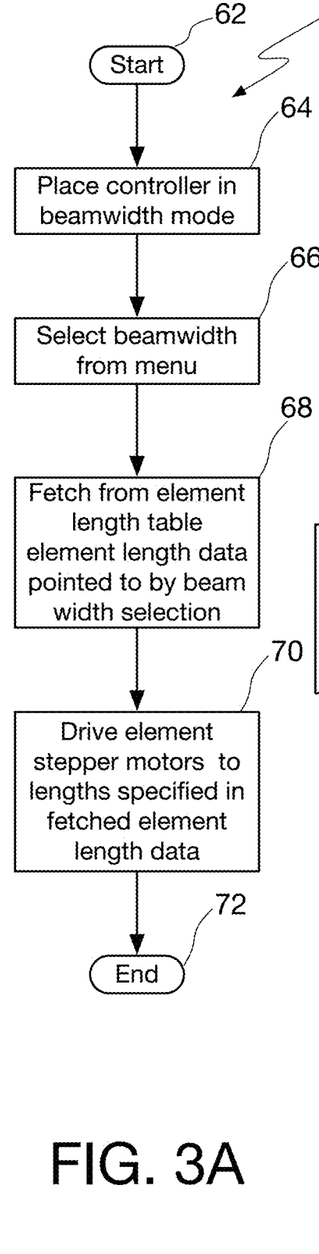
FIGS. 3A through 3F are flow diagrams showing illustrative methods for operating a controller to configure antennas having selected characteristics in accordance with several different aspects of the present invention.

Referring now to FIG. 3A, a flow diagram shows an illustrative method 60 for operating a controller to configure antennas having selectable beam widths in accordance with an aspect of the invention. The method begins at reference numeral 62.

At reference numeral 64 the controller is placed in beamwidth selection mode. This can be accomplished by a user activating a beamwidth selection function on the user interface.

At reference numeral 66 a beamwidth is selected by the user from among choices displayed on the display in response to the controller being placed in beamwidth selection function by user selection entry on the user interface.

At reference numeral 68, antenna element length data corresponding to the beamwidth selection entry made by the user is fetched from the element length table. At reference numeral 70, the controller engages the stepper motor controls to drive the stepper motors to adjust the lengths of the elements to the lengths fetched from the element length table. The method ends at reference numeral 72.

Figure 3B:
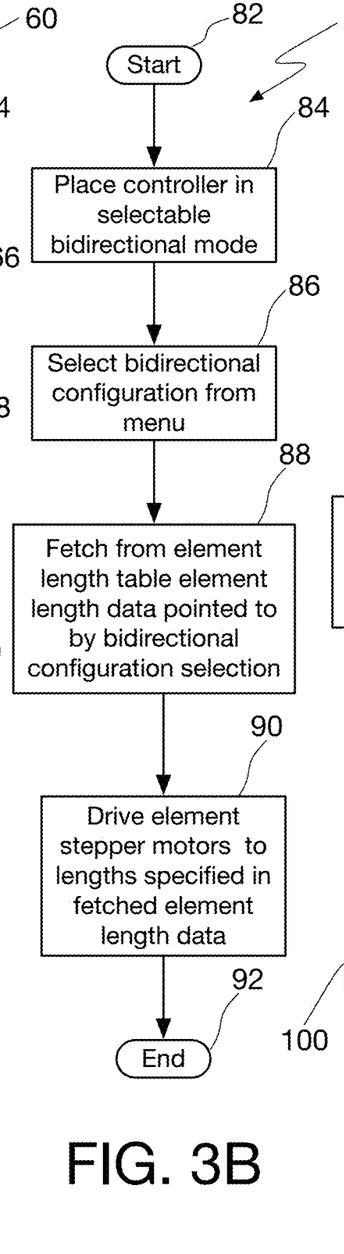

Referring now to FIG. 3B, a flow diagram shows an illustrative method 80 for operating a controller to configure antennas having selectable bidirectional modes in accordance with an aspect of the invention. The method begins at reference numeral 82.

At reference numeral 84 the controller is placed in selectable bidirectional mode. This can be accomplished by a user activating a bidirectional mode selection function on the user interface.

At reference numeral 86 a bidirectional mode is selected by the user from among choices displayed on the display in response to the controller being placed in bidirectional mode selection function by user selection entry on the user interface.

At reference numeral 88, antennal element length data corresponding to the bidirectional mode selection entry made by the user is fetched from the element length table. At reference numeral 90, the controller engages the stepper motor controls to drive the stepper motors to adjust the lengths of the elements to the lengths fetched from the element length table. The method ends at reference numeral 92.

Figure 3C:
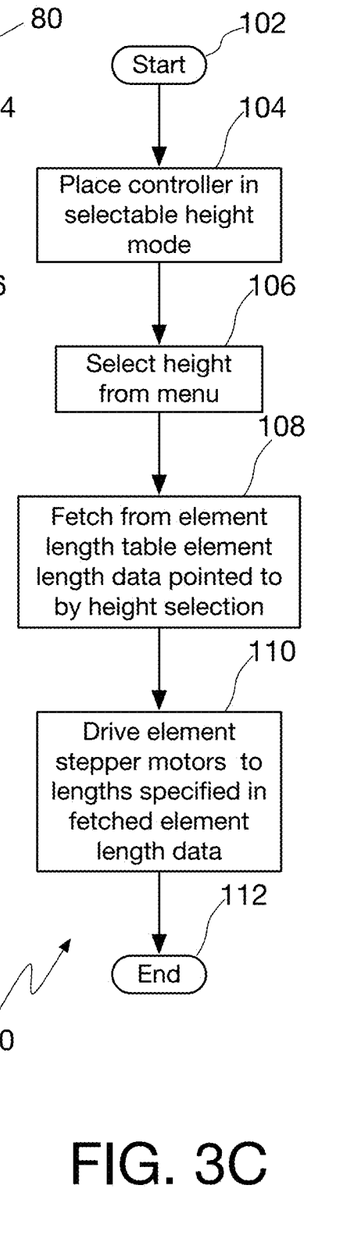

Referring now to FIG. 3C, a flow diagram shows an illustrative method 100 for operating a controller to configure antennas having selectable heights in accordance with an aspect of the invention. The method begins at reference numeral 102.

At reference numeral 104 the controller is placed in antenna height selection mode. This can be accomplished by a user activating an antenna height selection function on the user interface.

At reference numeral 106 an antenna height is selected by the user from among choices displayed on the display in response to the controller being placed in antenna height selection function by user selection entry on the user interface.

At reference numeral 108, antennal element length data corresponding to the antenna height selection entry made by the user is fetched from the element length table. At reference numeral 110, the controller engages the stepper motor controls to drive the stepper motors to adjust the lengths of the elements to the lengths fetched from the element length table. The method ends at reference numeral 112.

Figure 3D:
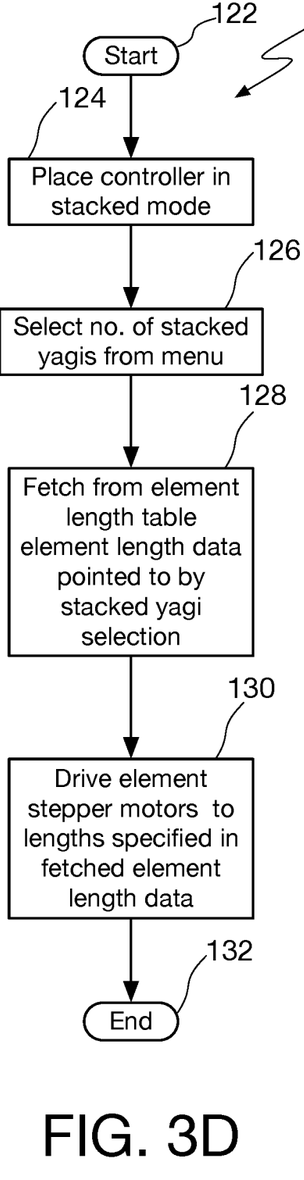

Referring now to FIG. 3D, a flow diagram shows an illustrative method 120 for operating a controller to configure stacked antennas in accordance with an aspect of the invention. The method begins at reference numeral 122.

At reference numeral 124 the controller is placed in stack selection mode. This can be accomplished by a user activating a stack selection function on the user interface.

At reference numeral 126 a number of stacked antennas is selected by the user from among choices displayed on the display in response to the controller being placed in stack selection function by user selection entry on the user interface.

At reference numeral 128, antennal element length data for each stacked antenna corresponding to the stack selection entry made by the user is fetched from the element length table. At reference numeral 130, the controller engages the stepper motor controls to drive the stepper motors to adjust the lengths of the elements of each stacked antenna to the lengths fetched from the element length table. The method ends at reference numeral 132.

Figure 3E:
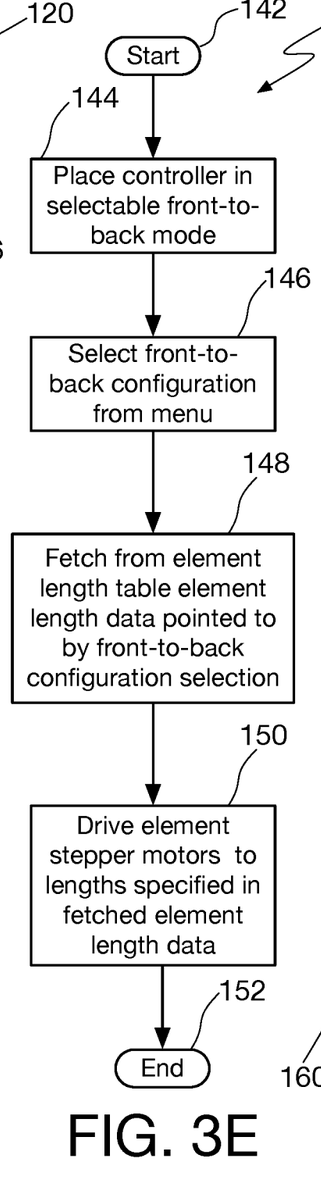

Referring now to FIG. 3E, a flow diagram shows an illustrative method 140 for operating a controller to configure antennas having selectable beam widths in accordance with an aspect of the invention. The method begins at reference numeral 142.

At reference numeral 144 the controller is placed in front-to-back selection mode. This can be accomplished by a user activating a front-to-back selection function on the user interface.

At reference numeral 146 a front-to-back gain ratio is selected by the user from among choices displayed on the display in response to the controller being placed in front-to-back selection function by user selection entry on the user interface.

At reference numeral 148, antennal element length data corresponding to the front-to-back gain ratio selection entry made by the user is fetched from the element length table. At reference numeral 150, the controller engages the stepper motor controls to drive the stepper motors to adjust the lengths of the elements to the lengths fetched from the element length table. The method ends at reference numeral 152.

Figure 3F:
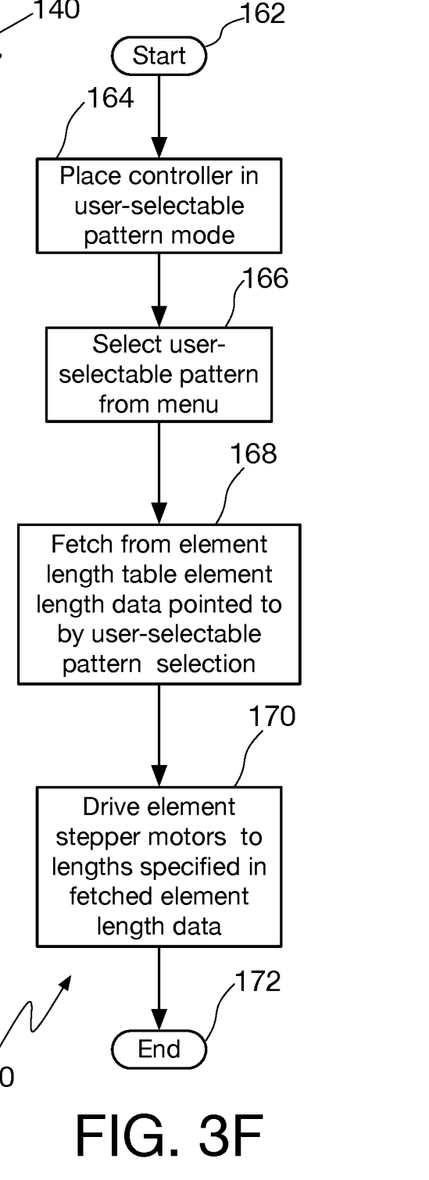

Referring now to FIG. 3F, a flow diagram shows an illustrative method 160 for operating a controller to configure antennas having user-selectable characteristics such as patterns, etc. in accordance with an aspect of the invention. The method begins at reference numeral 162.

At reference numeral 164 the controller is placed in user-selectable selection mode. This can be accomplished by a user activating a user-selectable selection function on the user interface.

At reference numeral 166 one of a plurality of pre-stored user-selectable antenna characteristics is selected by the user from among choices displayed on the display in response to the controller being placed in user-selectable selection function by user selection entry on the user interface.

At reference numeral 168, antennal element length data corresponding to the user-selectable characteristic selection entry made by the user is fetched from the element length table. At reference numeral 170, the controller engages the stepper motor controls to drive the stepper motors to adjust the lengths of the elements to the lengths fetched from the element length table. The method ends at reference numeral 172.

Persons of ordinary skill in the art will appreciate that the com port 28 of the controller shown in FIG. 2A or 2B may be used to communicate across a network, such as the internet, to one or more servers to upload and download libraries of antenna element length data that correspond to the user adjustable parameters discussed with reference to FIGS. 3A through 3F as well as to libraries or shared libraries of antenna element length data that correspond to any other user adjustable parameters.

Figure 4:
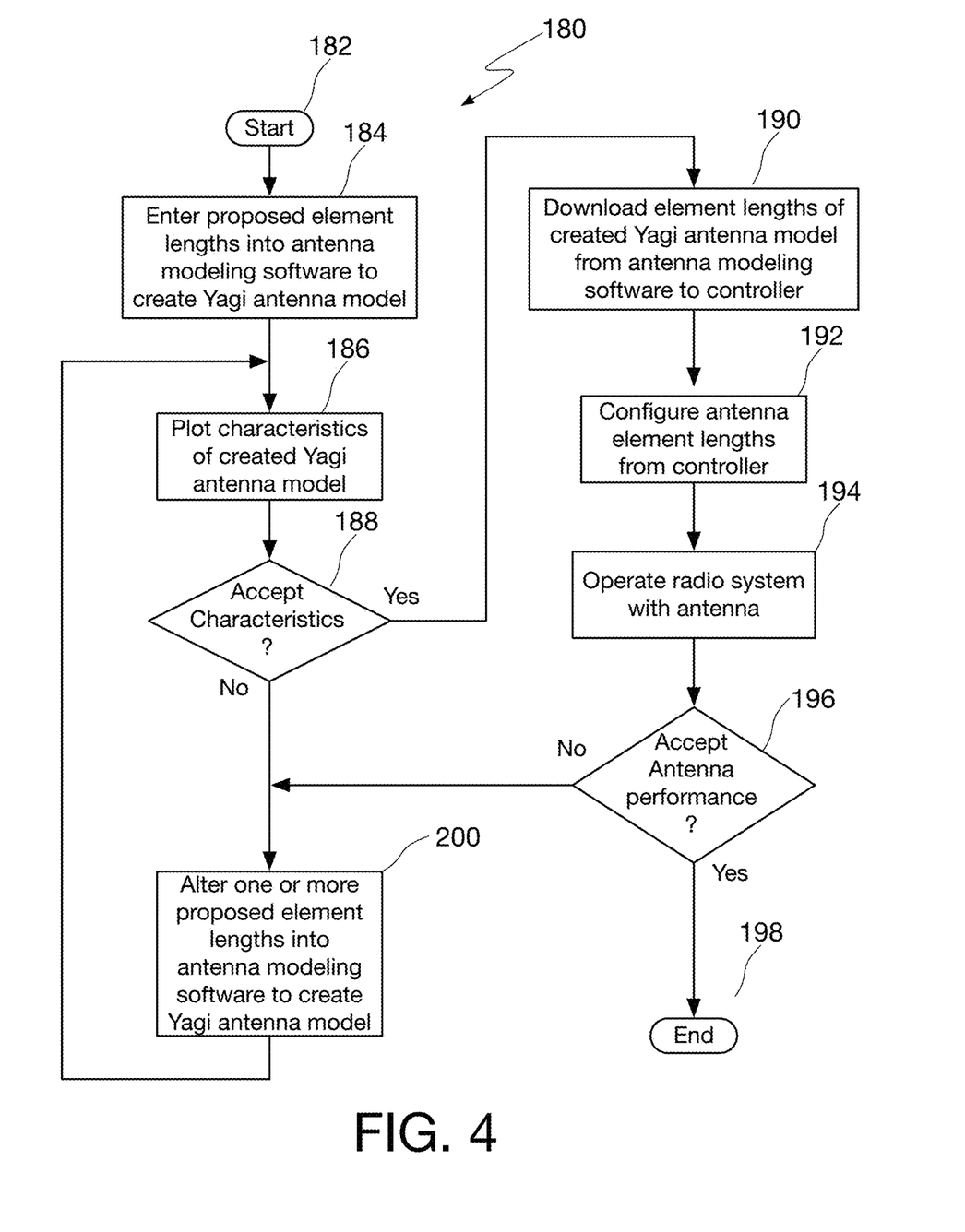
FIG. 4 is a flow diagram illustrating a method for operating a controller in accordance with one aspect of the present invention.

Referring now to FIG. 4 a flow diagram illustrates a method 180 according to one aspect of the present invention wherein a user interacts with an antenna modeling software program to design and implement a yagi antenna. The method begins at reference numeral 182.

At reference numeral 184 a user enters proposed element lengths into the antenna modeling software program running on the controller or on a computer running on the controller. At reference numeral 186 the antenna modeling software models the antenna and plots its characteristics.

At reference numeral 188 it is determined by the user if the characteristics are acceptable. If so, the method proceeds to reference numeral 190 where the element lengths of the modeled antenna are downloaded from the antenna modeling software to the controller.

At reference numeral 194 the radio system is operated with the configured antenna. At reference numeral 196 it is determined by the user if the antenna performance is acceptable. If so, the method ends at reference numeral 196. If not, the method proceeds to reference numeral 200 where one or more element lengths are altered in the antenna modeling software to create a new yagi antenna model. The method then again proceeds to reference numeral 186 and 188 as previously described.

If at reference numeral 188 the characteristics of the modeled antenna were deemed to be unacceptable, the method also again returns to reference numeral 186 and 188 as previously described reference numeral 186 and 188 as previously described.

Figure 5:
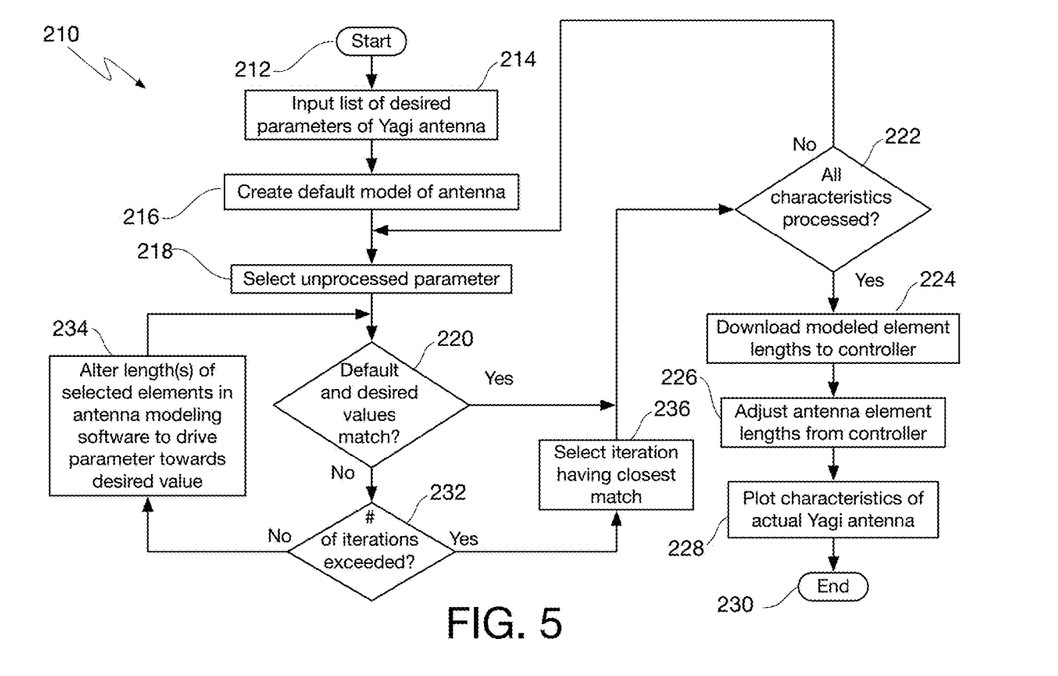
FIG. 5 is a flow diagram illustrating a method for operating a controller in accordance with another aspect of the present invention.

Referring now to FIG. 5 a flow diagram shows an illustrative method 210 according to one aspect of the present invention wherein an antenna modeling software program is interactively employed to design and implement a yagi antenna. The method begins at reference numeral 212.

At reference numeral 214, the antenna modeling software receives from a user an input list of desired parameters of a yagi antenna. At reference numeral 216 a default model of the antenna is created. At reference numeral 218, an unprocessed parameter is selected. At reference numeral 220 it is determined whether the default and desired values of the parameter match. If the values match the method proceeds to reference numeral 222 where it is determined whether all characteristics have been processed. If, so the method proceeds to reference numeral 24 where the modeled element lengths are downloaded to the controller. Next, at reference numeral 226 the lengths of the antenna elements are set by the controller to the determined values. At reference numeral 228, the characteristics of the actual yagi antenna are plotted. The method ends at reference numeral 230.

If at reference numeral 222 it was determined that not all characteristics have been processed, the method returns to reference numeral 218 and 220 where an unprocessed parameter is selected and processed.

If at reference numeral 220, it is determined that the default and desired values of the parameter do not match, the method proceeds to reference numeral 232, where it is determined whether a maximum number of iterations have been exceeded. If not, the tether proceeds to reference numeral 234, where the lengths of selected elements are altered in the antenna modeling software to drive the parameter towards the desired value and the method returns to reference numeral 220. If at reference numeral 232 it is determined that the maximum number of iterations have been exceeded the method proceeds to reference numeral 236 where the iteration having the closest match is selected. The method then proceeds to reference numeral 222.

Persons of ordinary skill in the art will appreciate that certain interactions will exist between different parameters and that the method of FIG. 5 may need to be repeated.

Figure 6:
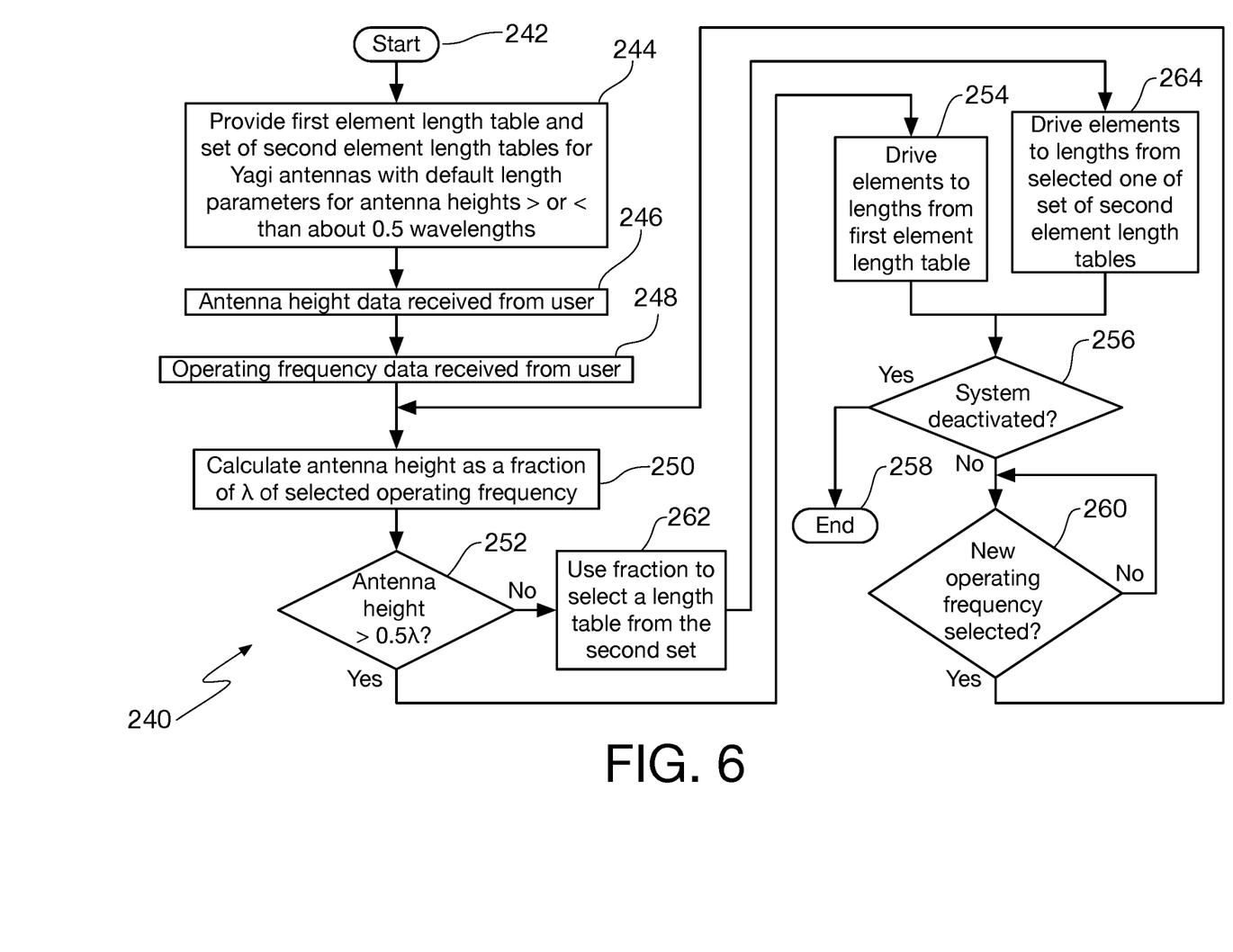
FIG. 6 is a flow diagram illustrating a method for operating a controller in accordance with another aspect of the present invention.

Referring now to FIG. 6, a flow diagram shows an illustrative method 240 according to one aspect of the present invention wherein element lengths of an adjustable yagi antenna may be optimized for the height of the antenna above ground. The method begins at reference numeral 242.

At reference numeral 244 a first element length table and set of second element length tables are provided for Yagi antennas. The tables have default parameters depending on whether antenna height is greater than or less than about 0.5 wavelengths at the intended operating frequency.

At reference numeral 248, antenna height data is received from a user. At reference numeral 248, operating frequency data is received from the user. At reference numeral 250, the antenna height as a fraction of the wavelength of the selected operating frequency is calculated.

At reference numeral 252 it is determined whether the antenna height is greater than 0.5 wavelengths at the operating frequency. If so the method proceeds to reference numeral 254 where the elements are driven to lengths from the first element length table. At reference numeral 256 it is determined if the system has been deactivated. If so the method ends at reference numeral 258. If not, the method proceeds to reference numeral 260 where the operating frequency is monitored for change. When a new operating frequency is sensed, the method proceeds to reference numeral 250, where the antenna height as a fraction of the wavelength of the newly selected operating frequency is calculated and the element length selection process begins again.

If at reference numeral 252 it is determined that the antenna height is less than 0.5 wavelengths at the operating frequency, the method proceeds to reference numeral 262, where the calculated fraction is used to select a length table selected from the second set of length tables. The second set of length tables is divided into a number of bins, each bin pointed to by a different range of fractions.

At reference numeral 246, antenna height data is received from a user. At reference numeral 248, operating frequency data is received from the user. At reference numeral 250, the antenna height as a fraction of the wavelength of the selected operating frequency is calculated.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the invention not be limited to any particular embodiment disclosed herein for carrying out this invention.

What is claimed is:

1. A system for controlling lengths of length adjustable elements of an antenna, the system comprising:
   a motor controller;
   element length tables coupled to the motor controller;
   a motor drive assembly coupled to each length adjustable element and to the motor controller and responsive to signals from the motor controller for adjusting a length of each length-adjustable antenna element to element lengths provided by the element length tables;
   a processor running antenna modeling software and coupled to the motor controller, the antenna modeling software responsive to modeled antenna lengths input to the processor by a user to generate antenna performance data as a function of the modeled antenna element lengths;
   a user interface including a display coupled to the motor controller and the processor;
   the motor controller operative to drive each motor drive assembly to adjust the lengths of the length-adjustable elements using one of data in the element length tables in response to a frequency command entered by a user into the user interface and modeled antenna length data from the antenna modeling software running in the processor in response to a user command to download to the motor controller the antenna element lengths input to the processor by the user.

2. The system of claim 1 wherein:
   the processor receives element length data from the user interface and generates antenna performance characteristics as a function of antenna element length data received from the user interface; and
   the processor provides the element length data to the motor controller in response to a command from the user interface.

3. The system of claim 2 wherein the element length data accepted from the user interface is stored in the element length tables in response to the command from the user interface.

4. The system of claim 1 wherein:
   the processor receives element length data from the motor controller, generates antenna performance characteristics as a function of the antenna element length data accepted from the motor controller, and displays the antenna performance characteristics on the display.

5. The system of claim 1 wherein the motor controller and the processor are coextensive.

6. The system of claim 1 wherein the processor is in a general-purpose computer and is coupled to the motor controller over a communications port.

7. A method for controlling lengths of length adjustable elements of an antenna, the method comprising:
   engaging a motor drive assembly coupled to each length adjustable element and in response to signals from a motor controller for adjusting the length of each length-adjustable antenna element;
   running antenna modeling software in a processor coupled to the motor controller, the antenna modeling software responsive to modeled antenna length data input through a user interface by a user to generate and display to the user antenna performance characteristics as a function of the modeled antenna element data lengths;

driving the motor controller for each motor drive assembly from data in the element length tables to adjust the lengths of the length-adjustable elements in response to one of a frequency command entered through the user interface to access the data in element length tables coupled to the motor controller and a user command to download to the motor controller the antenna element length data input to the antenna modeling software by the user.

8. The method of claim 7 further comprising:
generating in the processor antenna performance characteristics as a function of antenna element length data accepted from the user interface; and
providing by the processor element length data to the motor controller in response to a command from the user interface.

9. The system of claim 7 further comprising:
in response to a command from the user interface storing in the element length tables the element length data input through the user interface.

10. The method of claim 7 further comprising:
in response to a command from the user interface:
   accepting by the processor element length data from the motor controller;
   generating by the processor antenna performance characteristics as a function of the antenna element length data accepted from the motor controller, and
   displaying the antenna performance data characteristics on the display.

11. A method for controlling lengths of length adjustable elements of an antenna, the method comprising:
engaging a motor drive assembly coupled to each length adjustable element and in response to signals from a motor controller for adjusting the length of each length-adjustable antenna element to element lengths provided by element length tables coupled to the motor controller;
entering a command on a user interface to select an adjustable antenna characteristic;
selecting from among choices in a menu associated with the adjustable antenna characteristic a selection for configuring the selected adjustable antenna characteristic;
fetching from the element length table element length data pointed to by the selection; and
driving each motor drive assembly from the motor controller from the fetched element length data to adjust the lengths of the length-adjustable elements to configure the antenna to exhibit the selected adjustable antenna characteristic.

12. The method of claim 11 wherein the adjustable antenna characteristic is beamwidth.

13. The method of claim 11 wherein the adjustable antenna characteristic is a selectable bidirectional gain ratio.

14. The method of claim 11 wherein the adjustable antenna characteristic is selectable height.

15. The method of claim 11 wherein the adjustable antenna characteristic is number of stacked antennas.

16. The method of claim 11 wherein the adjustable antenna characteristic is front-to-back response.

17. The method of claim 11 wherein the adjustable antenna characteristic is a user-selectable pattern.

18. The method of claim 11 further comprising:
fetching from a server across a wide area network data comprising a menu for at least one adjustable operating parameter and element length data corresponding to menu choices for the at least one adjustable operating parameter.

* * * * *